United States Patent
Dharmalingam et al.

(10) Patent No.: US 11,526,486 B2
(45) Date of Patent: Dec. 13, 2022

(54) TIME-BASED DATA RETRIEVAL PREDICTION

(71) Applicant: PayPal, Inc., San Jose, CA (US)

(72) Inventors: Vijayalakshmi Dharmalingam, Santa Clara, CA (US); Rushik Navinbhai Upadhyay, San Jose, CA (US); Suraj Belavalgidad, Pleasanton, CA (US); Nikhil Rao, Santa Clara, CA (US); Chaitanya Maddipati, Fremont, CA (US); Meng Shi, San Jose, CA (US); Venkatesan Thirunaukkarasu, Fremont, CA (US)

(73) Assignee: PayPal, Inc., San Jose, CA (US)

( * ) Notice: Subject to any disclaimer, the term of this patent is extended or adjusted under 35 U.S.C. 154(b) by 178 days.

(21) Appl. No.: 16/843,524

(22) Filed: Apr. 8, 2020

(65) Prior Publication Data

US 2021/0319008 A1 Oct. 14, 2021

(51) Int. Cl.
*G06F 16/00* (2019.01)
*G06F 16/23* (2019.01)
(Continued)

(52) U.S. Cl.
CPC .......... *G06F 16/2322* (2019.01); *G06F 9/466* (2013.01); *G06N 3/02* (2013.01); *G06N 20/00* (2019.01)

(58) Field of Classification Search
CPC .. G06F 16/2455; G06F 16/2322; G06F 9/466; G06N 3/02; G06N 20/00
See application file for complete search history.

(56) References Cited

U.S. PATENT DOCUMENTS 9,898,717 B2 2/2018 Goeppinger
10,467,709 B2 11/2019 Maheshwari
(Continued)

OTHER PUBLICATIONS

Jason Brownlee, "Autoregression Models for Time Series Forecasting With Python," Jan. 2, 2017 in Time Series; Last Updated on Sep. 18, 2019; https://machinelearningmastery.com/autoregression-models-time-series-forecasting-python/, 45 pages. [Retrieved Mar. 26, 2020].

(Continued)

*Primary Examiner* — Shiow-Jy Fan
(74) *Attorney, Agent, or Firm* — Kowert, Hood, Munyon, Rankin & Goetzel, P.C. Catherine; Catherine L. Gerhardt; Dean M. Munyon (57) ABSTRACT

Techniques are disclosed relating to determining a predicted time interval for querying a database beginning at a starting point in time to retrieve a specified number of records. A computer system receives a request for records from a database that stores timestamped records, where the request is for a specified number of records beginning at a starting point in time. The computer system then determines a predicted time interval for querying the database beginning at the starting point in time to retrieve the specified number of records, where the predicted time interval may be determined by a machine learning module that is trained using historical database transaction data. Such techniques may advantageously improve the efficiency of individual queries in fetching a desired amount of data from a database for applications.

20 Claims, 9 Drawing Sheets (51) Int. Cl.
*G06N 3/02* (2006.01)
*G06N 20/00* (2019.01)
*G06F 9/46* (2006.01)

(56) References Cited

U.S. PATENT DOCUMENTS

| | | | |
|---|---|---|---|
| 2004/0236757 A1* | 11/2004 | Caccavale | G06F 11/3495 |
| 2010/0169489 A1* | 7/2010 | Akiyama | G06Q 30/0645 |
| | | | 705/40 |
| 2018/0060738 A1* | 3/2018 | Achin | G06N 20/00 |
| 2018/0114126 A1* | 4/2018 | Das | G06F 3/04847 |
| 2018/0121539 A1* | 5/2018 | Ciulla | G06F 16/3344 |
| 2019/0066110 A1 | 2/2019 | Shen et al. | |
| 2019/0179300 A1* | 6/2019 | Cella | H04L 67/12 |
| 2019/0384790 A1* | 12/2019 | Bequet | G06F 16/90344 |
| 2020/0074274 A1* | 3/2020 | Fan | G06F 17/11 |
| 2020/0225655 A1* | 7/2020 | Cella | G05B 23/0264 |
| 2020/0242506 A1* | 7/2020 | Kelly | G06N 3/088 |

OTHER PUBLICATIONS

Time series forecasting; https://uber.github.io/ludwig/examples/#time-series-forecasting, 33 pages. [Retrieved Mar. 26, 2020].

* cited by examiner

TIME-BASED DATA RETRIEVAL PREDICTION

BACKGROUND

Technical Field

This disclosure relates generally to data processing, and, more specifically, to techniques for predicting time intervals for data retrieval.

Description of the Related Art

In some instances, applications send requests to a server to retrieve data from a database. The database may contain records for transactions, such as payment transactions, as well as timestamps specifying when these transactions occurred. Applications may request these transaction records in order to analyze payment patterns, for example.

For various reasons, the applications requesting records and the server retrieving these records may be limited in the amount of data they can handle. For example, an application may only be able to process a particular number of records at a time. Similarly, the server may only be able to retrieve a particular number of records per database query. In some situations, an application may wish to retrieve a given number of records beginning at a particular timestamp, in order to analyze data associated with that time. Accordingly, when fetching large amounts of data through an API endpoint, it is useful for an application to specify a particular time interval in which to retrieve a manageable amount of data (often with paginations).

In many cases, however, the amount of data that is recorded within a given time interval is unknown to both the application and the server. Specifically, depending on the source of the data and the nature of distribution of this data, the database may contain millions of records or just a few records within a particular time interval. In each of these situations, without a known time interval from which to retrieve records, the server will not be able to return the number of records specified by the application within a single call to the database. For example, within a particular time interval, millions of records may be recorded, in which case the server will not be able to return all of these records in a single database query. As another example, within a particular time interval, only a few records may be recorded, in which case the server will waste a portion of its capacity during a call that retrieves records that were recorded within the particular time interval. As a result, the retrieval performed by the server is often inefficient.

This specification includes references to various embodiments, to indicate that the present disclosure is not intended to refer to one particular implementation, but rather a range of embodiments that fall within the spirit of the present disclosure, including the appended claims. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "computer system configured to predict a time interval for retrieving a specified number of records" is intended to cover, for example, a computer system that performs this function during operation, even if it is not currently being used (e.g., when its power supply is not connected). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed mobile computing device, for example, would not be considered to be "configured to" perform some specific function, although it may be "configurable to" perform that function. After appropriate programming, the mobile computing device may then be configured to perform that function.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the terms "first," "second," etc. are used as labels for nouns that they precede, and do not imply any type of ordering (e.g., spatial, temporal, logical, etc.) unless specifically stated. For example, in a computing system having multiple user accounts, the terms "first" and "second" user accounts can be used to refer to any users. In other words, the "first" and "second" user accounts are not limited to the initial two created user accounts, for example.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor and is used to determine A or affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the term "module" refers to circuitry configured to perform specified operations or to physical non-transitory computer readable media that store information (e.g., program instructions) that instructs other circuitry (e.g., a processor) to perform specified operations. Modules may be implemented in multiple ways, including as a hardwired circuit or as a memory having program instructions stored therein that are executable by one or more processors to perform the operations. A hardware circuit may include, for example, custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, or the like. A module may also be any suitable form of non-transitory computer readable media storing program instructions executable to perform specified operations.

DETAILED DESCRIPTION

Techniques are disclosed for predicting a time interval in which a target number of records are recorded in order for a server to efficiently retrieve the target number of records. For example, the disclosed system may be trained to predict how many records were recorded and stored in a database within various intervals of time. This may be important, in various situations, because applications may desire to retrieve a specific number of records based on one or more of the following limitations: hardware, user-specified requirements (e.g., analysis computations on a particular number of records is optimal in certain scenarios), bandwidth, etc. Specifically, a client application may have computation limitations such that the application processes a limited number of records at a given time as records are received from the server. Additionally, applications may wish to analyze records that were recorded close to a particular time. For example, applications may desire to analyze payment transactions that occurred at a particular time-of-day in order to predict sales activity or customer service needs at that particular time on future days. Accordingly, the disclosed system may be trained to predict a time interval for retrieving a particular number of records beginning at a time that is specified by the application.

The data fetching performed by a database server is often inefficient if a time interval within which to retrieve this data is not specified by a client application requesting this data. Specifically, if a transaction server is fetching transaction records from a database, it may either return too much data or too little data in a single query to the database. If the server does not know a particular time interval in which the desired number of records occurred, then the server may do extra work or the server may waste computing resources when it retrieves less than a desired amount of data in a query to the database. For example, if the server retrieves less than the desired amount of data, then it may need to perform additional queries to the database in order to retrieve the rest of the desired data which, in turn, will tie up computing resources for a longer amount of time. In addition, this multi-query process will be slow in retrieving the desired amount of data relative to a process that involves a single query to the database. Either way, the transaction server will not be performing efficiently. If, however, a time interval in which the target number of records occurs is known up-front, then the transaction server may efficiently retrieve the target number of records without wasting computing resources.

The present disclosure describes techniques for training a machine learning module to predict a time interval for fetching a specified number of target records from a database beginning at a specified start time. (Different modules may be used for different number of target records.) The training involves feeding historical transaction data into the machine learning module. The historical transaction data may include transactions and timestamps for the transactions and may be processed prior to being used for training such that timestamps of the transactions are in a format that is usable for training.

For instance, the disclosed system may train a machine learning module based on the number of target records being specified (e.g., as 50) for fetching. In this example, the historical transaction data may indicate that from a first starting point in time, $t_1$ to 39 seconds later in time, 50 records were recorded in the database. The historical transaction data may also indicate that from a second starting point in time to 37 seconds later in time $t_2$, 50 records were recorded in the database. Continuing this example, the historical transaction data may indicate that from a tenth starting point in time $t_{10}$ to 42 seconds later in time, 50 records were recorded in the database. Based on this historical transaction data, the disclosed system generates training data. For example, a time-series feature vector [39, 37, . . . , 42] of length 10 may be generated from the time intervals indicated in the historical transaction data. This vector may be input to the machine learning module during training and the module may output a predicted time interval for retrieving records beginning from the eleventh starting point in time $t_{11}$. Once the machine learning module predicts a time interval for retrieving records from the eleventh starting point in time $t_{11}$, this interval may be used to query the database to efficiently retrieve 50 records.

As one specific example, in some situations, an application may want to analyze sales data for houses in a given geographical area. In particular, an application may request records indicating houses that were sold in San Francisco on Feb. 18, 1920 starting at 10 AM. In this example, however, due to bandwidth limitations, the analysis application can only receive 100 records at a time from the transaction server. As a result, to perform the retrieval efficiently, the disclosed system determines a time interval for retrieving 100 records from the database starting at 10 AM and supplies this interval to the analysis application for inclusion in a request for the 100 records.

Example Time Interval Prediction

Figure 1A:
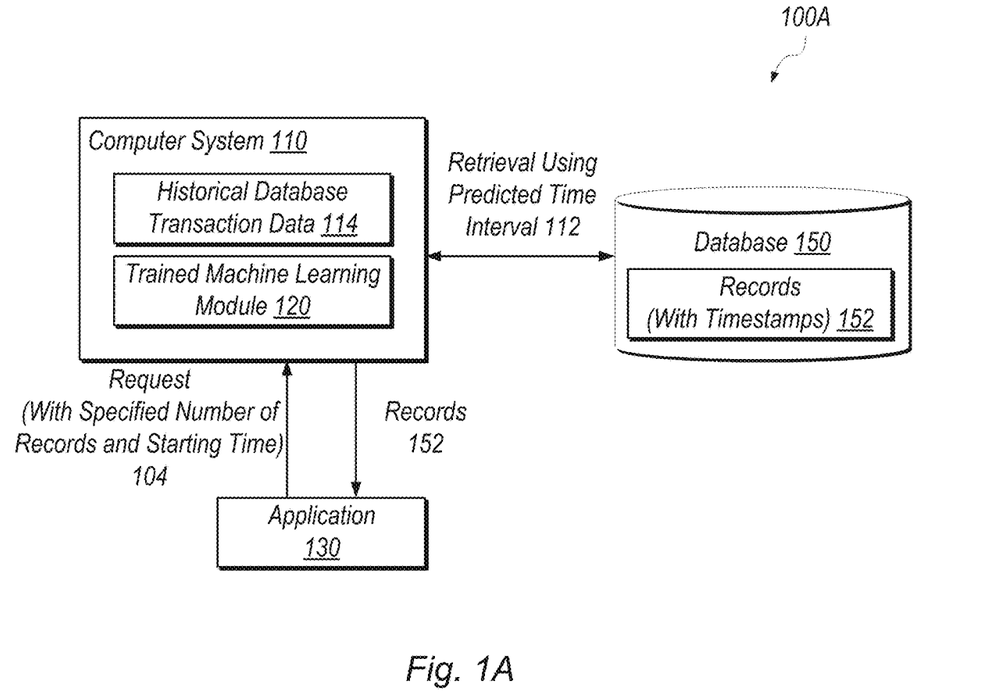
FIG. 1A is a block diagram illustrating a computer system configured to automatically retrieve records from a database based on predicting a time interval for the retrieval, according to some embodiments.
Figure 1B:
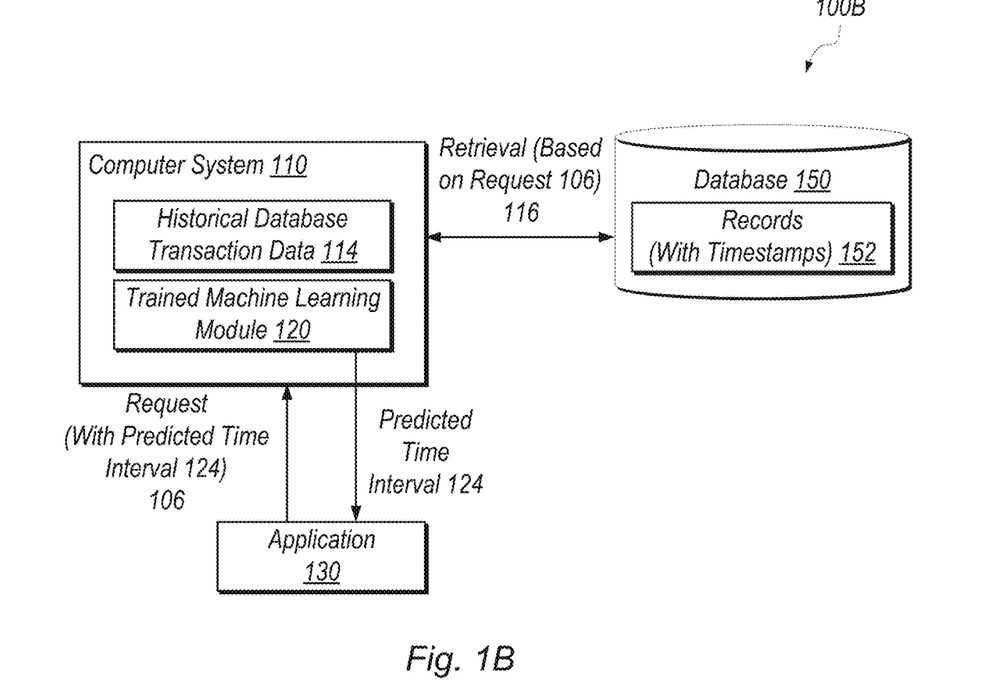
FIG. 1B is a block diagram illustrating a computer system configured to provide a predicted time interval for retrieving records to an application, according to some embodiments.

FIG. 1A is a block diagram illustrating a computer system 110 configured to automatically retrieve records 152 from a database 150 based on predicting a time interval for the retrieval. FIG. 1B is a block diagram illustrating a computer system 110 configured to provide a predicted time interval 124 for retrieving records 152 for application 130. While FIG. 1A illustrates a system 100A that is configured to automatically retrieve records based on predicting a time interval, FIG. 1B illustrates a system 100B that does not automatically retrieve records, but instead provides a predicted time interval to application 130 for retrieval of records at a later time. In the illustrated embodiment, systems 100 include computer system 110 with a trained machine learning module 120, an application 130, and a database 150, respectively.

Figure 2A:
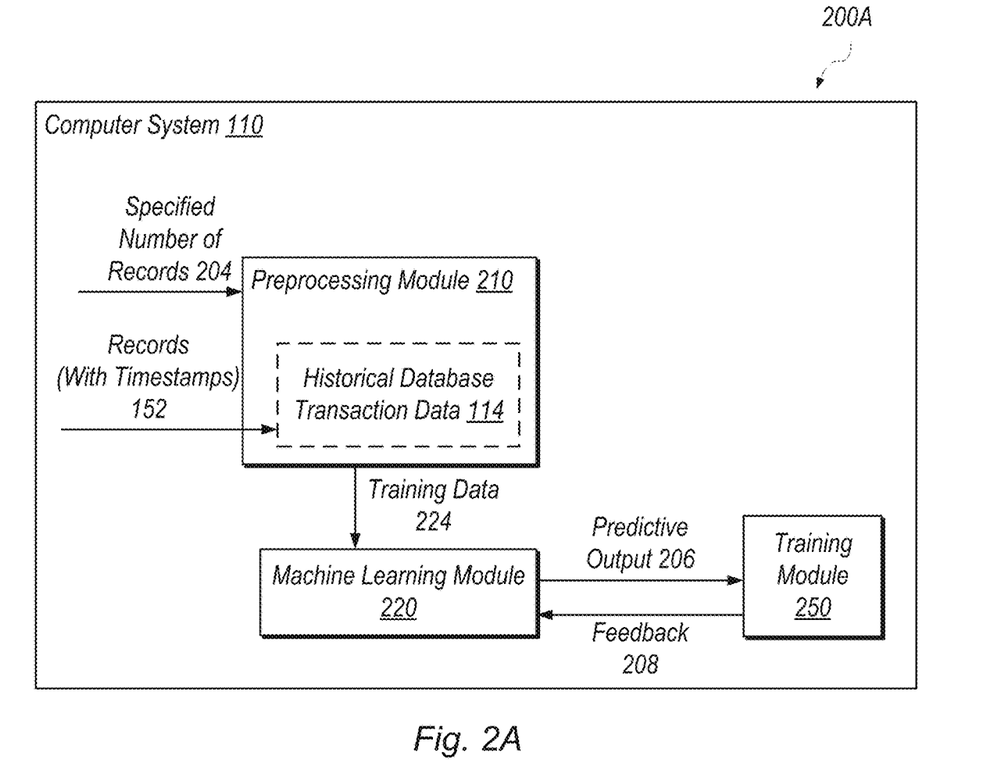
FIGS. 2A and 2B are block diagrams illustrating training of a machine learning module and time interval prediction by the trained machine learning module, respectively, according to some embodiments.
Figure 2B:
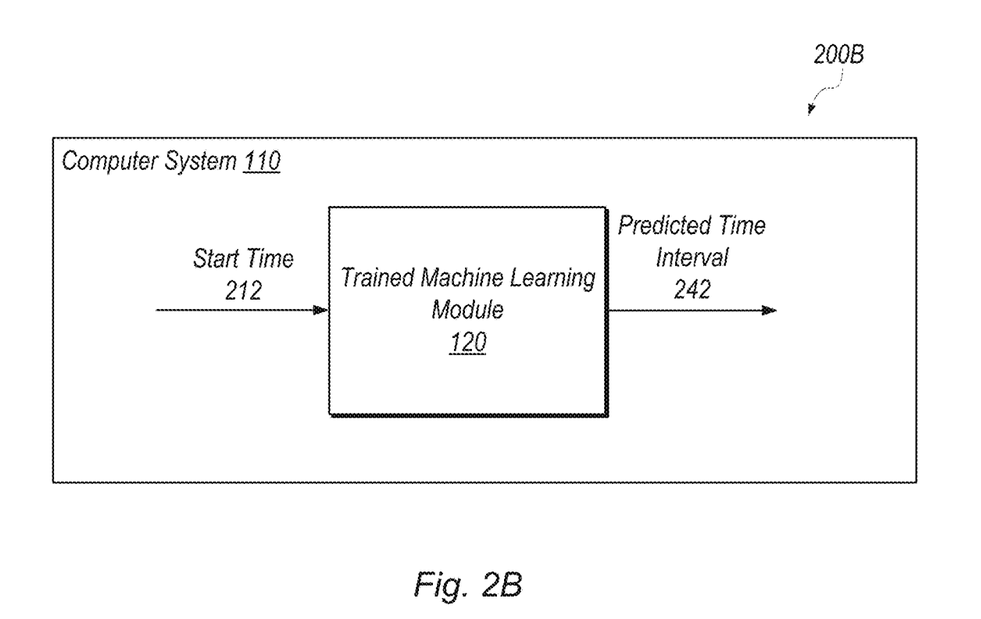
Figure 6A:
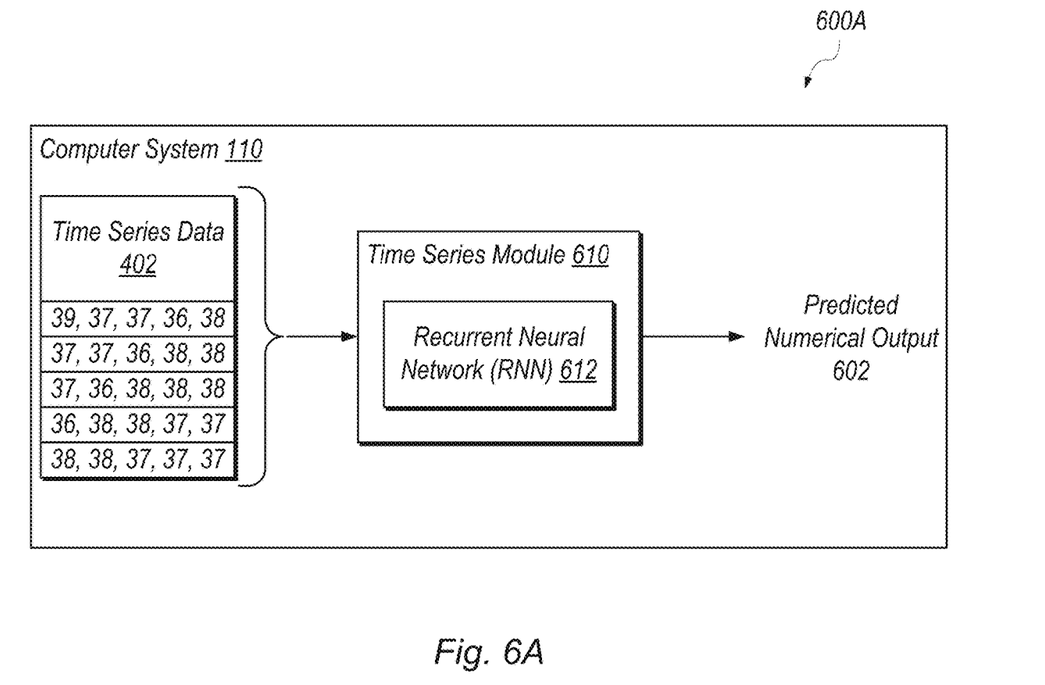
FIGS. 6A and 6B are block diagrams illustrating two different machine learning modules that are trained using different sets of training data, according to some embodiments.
Figure 6B:
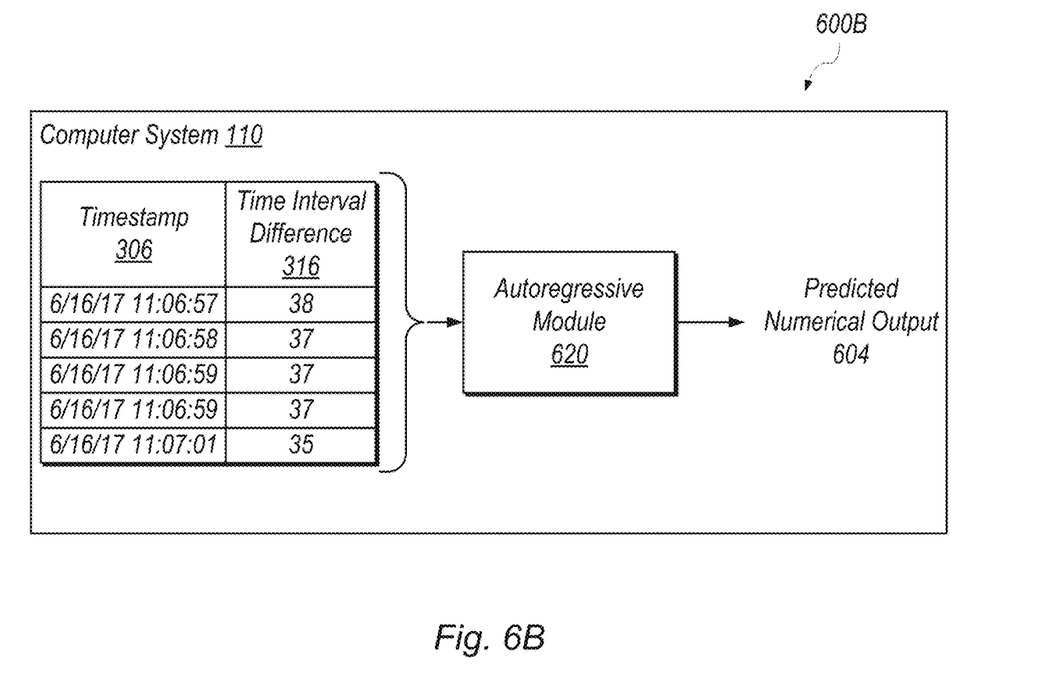

In FIG. 1A, computer system 110 is configured to receive a request 104 from application 130 that includes a specified number of records and a starting point in time. The specified number of records may also be referred to as the "target" number of records. Based on the request 104, computer system 110 is configured to use trained machine learning module 120 to predict a time interval for retrieving the specified number of records beginning at the starting point in time. Training of machine learning module 120 is discussed in detail below with reference to FIGS. 2, 6A, and 6B. Specifically, FIG. 2 illustrates training of a machine learning module using training data generated based on a specified number of records, while FIGS. 6A and 6B illustrate two example machine learning algorithms that may be used during training. Note that the training illustrated in FIG. 2 is based on a specified number of records 204 and that each machine learning module 220 may be training using a different set of training data 224 generated based on a different specified number of records.

Application 130 may send request 104 for the specified number of records based on processing limitations of the application. Specifically, application 130 may be configured to handle a particular number of records at one time. For example, application 130 may be a statistical analysis application that is configured to analyze the content of only 50 records at a given time and, therefore, requests 50 records from computer system 110. In this example, in order to provide 50 records efficiently, computer system 110 needs to know a specific time interval from which to retrieve the records beginning at the time specified by the application. Otherwise, computer system 110 may retrieve too many or too few records, resulting in additional processing time which, in turn, may cause inefficiencies.

At retrieval 112, computer system 110 automatically retrieves records 152 from database 150 whose timestamps fall within the predicted time interval. For example, the records 152 retrieved from database 150 include transaction identifiers (IDs) and timestamps indicating a date and time at which transactions occurred. After retrieving records 152, computer system 110 transmits them to application 130.

In some embodiments, another application interacts with computer system 110 in addition to application 130. This other application requests that computer system 110 process a transaction. For example, a user may request authorization of a payment transaction via a payment application on their mobile device. In this example, computer system 110 processes the payment transaction and then stores a record of the transaction (one example of historical database transaction data 114) in database 150. Further, in this example, computer system 110 may process payment transactions for various different users and store this information in database 150. In some situations, computer system 110 generates trained machine learning module 120 using payment transaction data stored in database 150. In such situations, application 130 may request payment transaction records and computer system 110 retrieves the records from database 150 based on a predicted time interval generated by trained machine learning module 120. Then, computer system 110 may automatically provide the payment transaction records to application 130. In some scenarios, application 130 analyzes the payment transaction records for various uses, in order to: generate payment reports, improve payment security, perform fraud detection, etc.

In FIGS. 1A and 1, computer system 110 includes historical database transaction data 114. This data corresponds to records that occurred prior to a time at which computer system 110 is predicting a time interval for retrieving records. In some embodiments, computer system 110 uses historical database transaction data 114 to generate trained machine learning module 120 for predicting a time interval. In other embodiments, machine learning module 120 is trained by another computer system and then provided to computer system 110 for predicting time intervals for record retrieval. In some embodiments, machine learning module 120 includes multiple machine learning models. For example, machine learning module 120 may include both a recurrent neural network (RNN) model and an autoregressive model that are trained by computer system 110. In order to train module 120, computer system 110 may retrieve, prior to predicting a time interval, historical database transaction data 114 from database 150. This historical database transaction data 114 is preprocessed based on the specified number of records to generate training data 224. For example, if the specified number of records is 50, then sets of 50 records may be selected from historical transaction data 114 for training data 224. Note that historical database transaction data 114 is discussed in detail below with reference to FIG. 3.

In FIG. 1B, computer system 110 is configured to transmit predicted time interval 124 to application 130. In this scenario, computer system 110 does not automatically retrieve records 152 from database 150, but instead provides the predicted time interval to application 130 for later use in retrieving records. In the illustrated embodiment, computer system 110 receives a request 106 from application 130 that specifies the time interval 124 predicted by module 120. Request 106 also specifies a start time. At 116, based on request 106, computer system 110 retrieves a target number of records 152 whose timestamps indicate that these records occurred after the specified starting time and within the predicted time interval 124.

Example Machine Learning Module

FIGS. 2A and 2B are block diagrams illustrating training of a machine learning module 220 and time interval prediction by trained machine learning module 120, respectively. Specifically, in FIG. 2A, system 200A illustrates training of machine learning module 220, while in FIG. 2B, system 200B illustrates prediction of a time interval 242 by trained machine learning module 120.

In FIG. 2A, preprocessing module 210 receives a specified number of records 204 from application 130. Additionally, preprocessing module 210 receives records 152 that include an identifier and timestamps for various transactions and stores the records as historical database transaction data 114. These records 152 are retrieved by computer system 110 from database 150. Based on the stored historical database transaction data 114, preprocessing module 210 generates training data 224 and inputs the training data to machine learning module 220 for training. Note that the implementation of preprocessing module 210 is discussed in further detail below with reference to FIGS. 3-5.

Machine learning module 220, in the illustrated embodiment, generates predictive output 206 based on the training data 224 and provides this information to training module 250. For example, machine learning module 220 may include an autoregressive model that receives a timestamp (i.e., a starting point in time) as input and outputs a time interval for retrieving a specified number of records starting at the timestamp. After evaluating the output 206 of machine learning module 220, training module 250 provides feedback 208 to the machine learning module. For example, training module 250 may compare a predicted time interval output by machine learning module 220 with a known time interval included in training data 224. Based on these two values being different, the feedback 208 may include, for example, adjusted weights for the machine learning module 220. As one specific example, training module 250 may split training data 224 into batches of feature inputs (e.g., with a batch size of 128) and may provide these feature inputs to machine learning module 220 during training. Machine learning module 220 may be a recurrent neural network (RNN), in this example. Based on the output of module 220 for this batch, training module 250 adjusts the weights for the next batch of feature inputs in order to reduce the output of a loss function (e.g., mean squared error). Specifically, during this training process, the subsequent batches of feature inputs pick up the weights during each previous batch run. Training module 250 may repeat this process until there is little or no improvement in minimizing the loss. Loss or mean squared error may be calculated by training module 250 as the average of the squared forecast error values. Note that squaring the forecast error values causes these values to be positive and may also have the effect of putting more weight on larger errors.

Trained machine learning module 120 is generated based on specified number of records 204 and, therefore, this machine learning module is executable to predict a time interval for retrieving the specified number of records. If a time interval prediction is desired for a different number of records, then another machine learning module may be trained by computer system 110 using training data 224 that is generated based on the different number of records. As one specific example, machine learning module 220 may be trained based on the specified number of records 204 being 100 records, while another machine learning module may be trained based on the specified number of records being 25 records.

In some embodiments, as new records 152 are stored in database 150, trained machine learning module 120 is trained by training module 250 using training data generated using the new records. Although machine learning module 220 may be trained using any of various machine learning techniques, two specific example techniques with corresponding training inputs are discussed below with reference to FIG. 6.

In FIG. 2B, trained machine learning module 120, via computer system 110, receives a start time 212 from application 130 and outputs a predicted time interval 242. This time interval is usable for retrieving the specified number of records 204 from database 150 beginning at start time 212. This retrieval may be performed, for example, by computer system 110 or application 130.

Example Time Interval Difference

Figure 3:
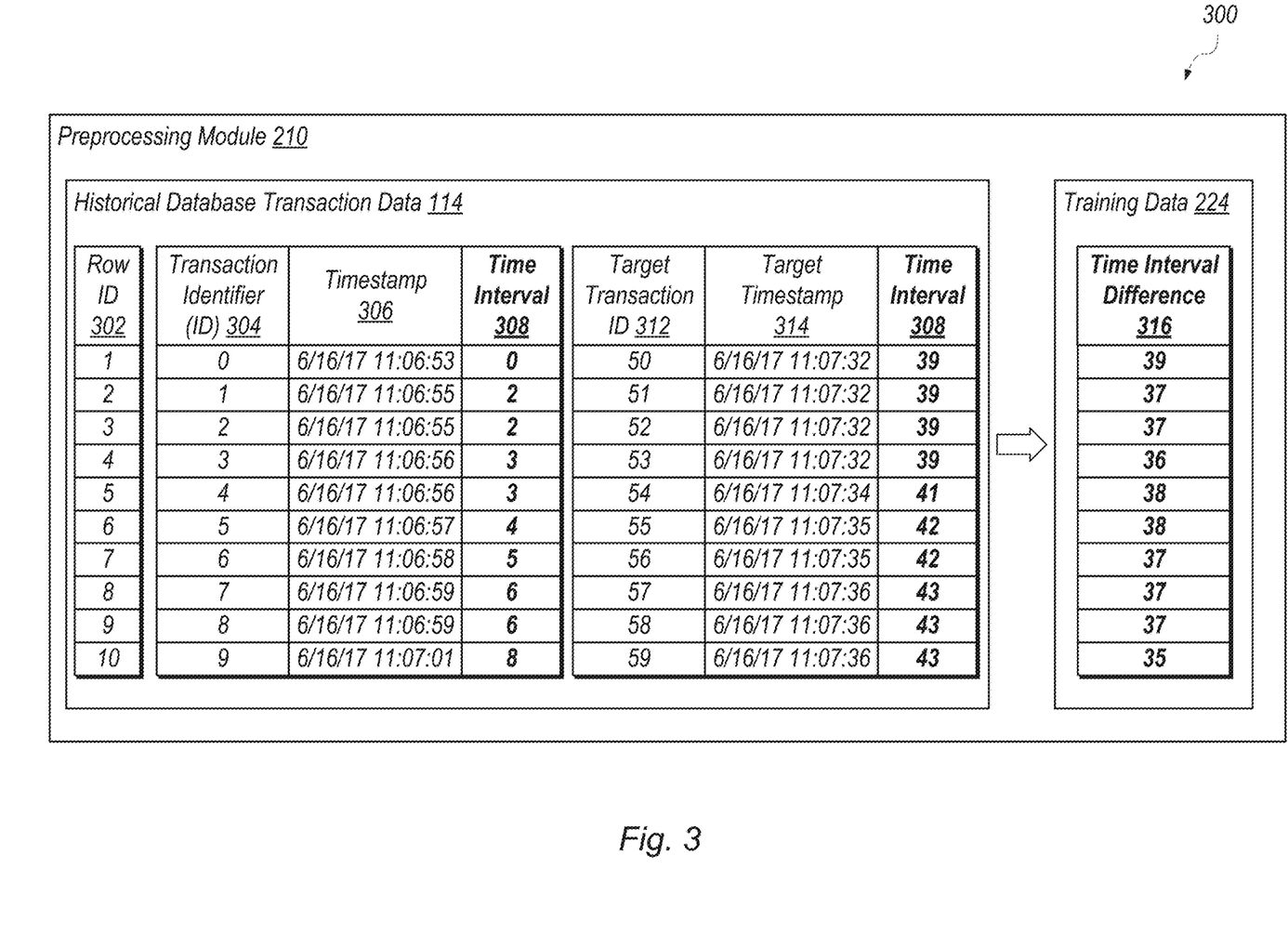
FIG. 3 is a block diagram illustrating example historical database transaction data and training data, according to some embodiments.

FIG. 3 is a block diagram illustrating a system 300 that includes example historical database transaction data 114 and training data 224. In the illustrated embodiment, historical database transaction data 114 includes a table with the following columns for transaction data: row identifier (ID) 302, transaction ID 304, timestamp 306, time interval 308, target transaction ID 312, and target timestamp 314. Training data 224 includes a time interval difference 316 column with values for the difference between time intervals of corresponding rows of transactions 304 and target transactions 312 included in the historical database transaction data 114 table.

In the illustrated embodiment, a first set of ten transactions is shown with timestamps 306 and a second set of ten target transactions are shown with target timestamps 314. Time interval 308 values for each transaction in the two sets are shown in bold. In this example, computer system 110 retrieves these two sets of records from database 150 based on a target number of records specified by application 130. Specifically, these two sets of records are separated by the target number of records (i.e., 50 records). Computer system 110 then uses these two sets of data to generate training data for training machine learning module 220 to predict a time interval from which to retrieve the target number of records. A time interval 308 is shown for each of transactions 0-9 and transactions 50-59 in seconds. This time interval is measured from the timestamp 306 of transaction 0, which in this example is 6/16/17 at 11:06:53 PM.

Preprocessing module 210 generates training data 224 based on the two bolded time interval 308 columns shown in the illustrated embodiment. Specifically, preprocessing module 210 determines a time interval difference 316 between the time intervals for corresponding pairs of records 0-9 and the time intervals for records 50-59. For example, the time interval difference 316 between records 1 and 51 is 37 seconds, while the time interval difference between records 9 and 59 is 35 seconds. Once preprocessing module 210 has determined time interval difference 316 values for these records, this information is used by computer system 110 to train machine learning module 220 as discussed in further detail below with reference to FIG. 6.

In some embodiments, training data 224 is generated from time intervals that are measured from different starting times. For example, preprocessing module 210 may select multiple different starting transactions (e.g., transaction 0) from which to measure time intervals 308. In this example, different sets of 10 time interval difference values are generated by preprocessing module 210. These different sets of time interval difference values may correspond to different times of day or different days. For example, the number of transactions recorded within a specific time interval may very based on the time of day or the specific day from which historical transaction data 114 is gathered. As one specific example, a greater amount of payment transactions may be recorded on a Saturday afternoon than on a Monday morning. Therefore, training data 224 may include time interval difference values generated from transactions recorded at various different times of day and on various different days.

Example Time-Series Data

Figure 4:
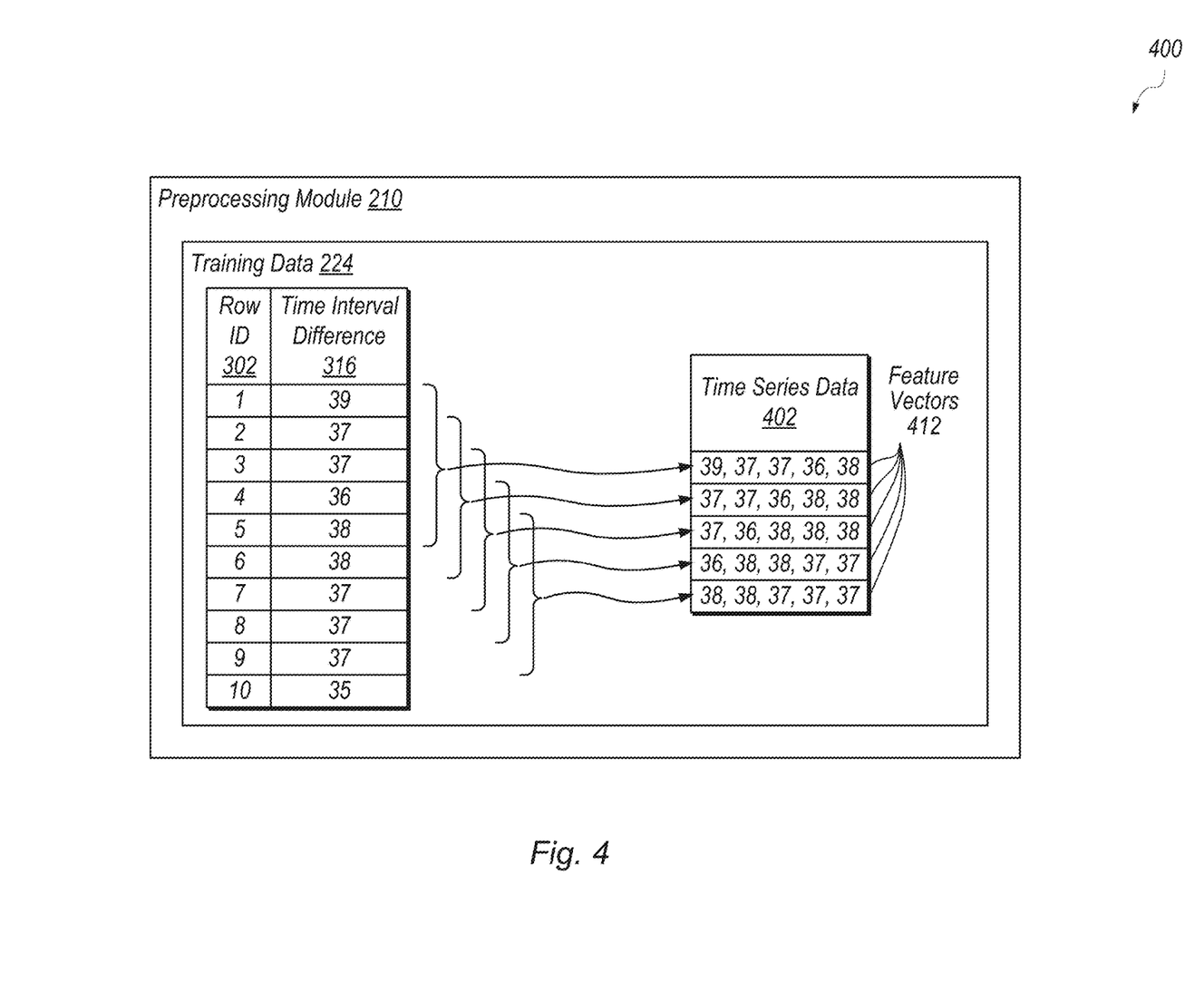
FIG. 4 is a block diagram illustrating example time-series data including feature vectors, according to some embodiments.

FIG. 4 is a block diagram illustrating a system 400 that includes example time-series data 402 made up of feature vectors 412. The features included in feature vectors 412, in the illustrated embodiment, are numerical values representing a time interval, in seconds, in which 50 transactions occurred. In the illustrated embodiment, preprocessing module 210 uses the determined time interval difference 315 to generate time-series data 402.

Time-series data 402, in the illustrated embodiment, is made up of five different feature vectors 412. Preprocessing module 210, in the illustrated embodiment, generates these feature vectors 412 using time interval difference 316 values. For example, preprocessing module 210 generates feature vectors 412 that include a running window of size five of time interval difference 316 values. For example, each window of five different time interval difference values overlaps by four values with the previous window. Specifically, the first feature vector 412 includes time interval differences 39, 37, 37, 36, 38, while the second feature vector includes time interval differences 37, 37, 36, 38, 38. In this example, values 37, 37, 36, and 38 overlap between the first and second feature vectors 412. Note that the window size selected by preprocessing module 210 is tunable and may differ from the example window used to generate the time-series data shown in FIG. 4.

Example Training Data

Figure 5:
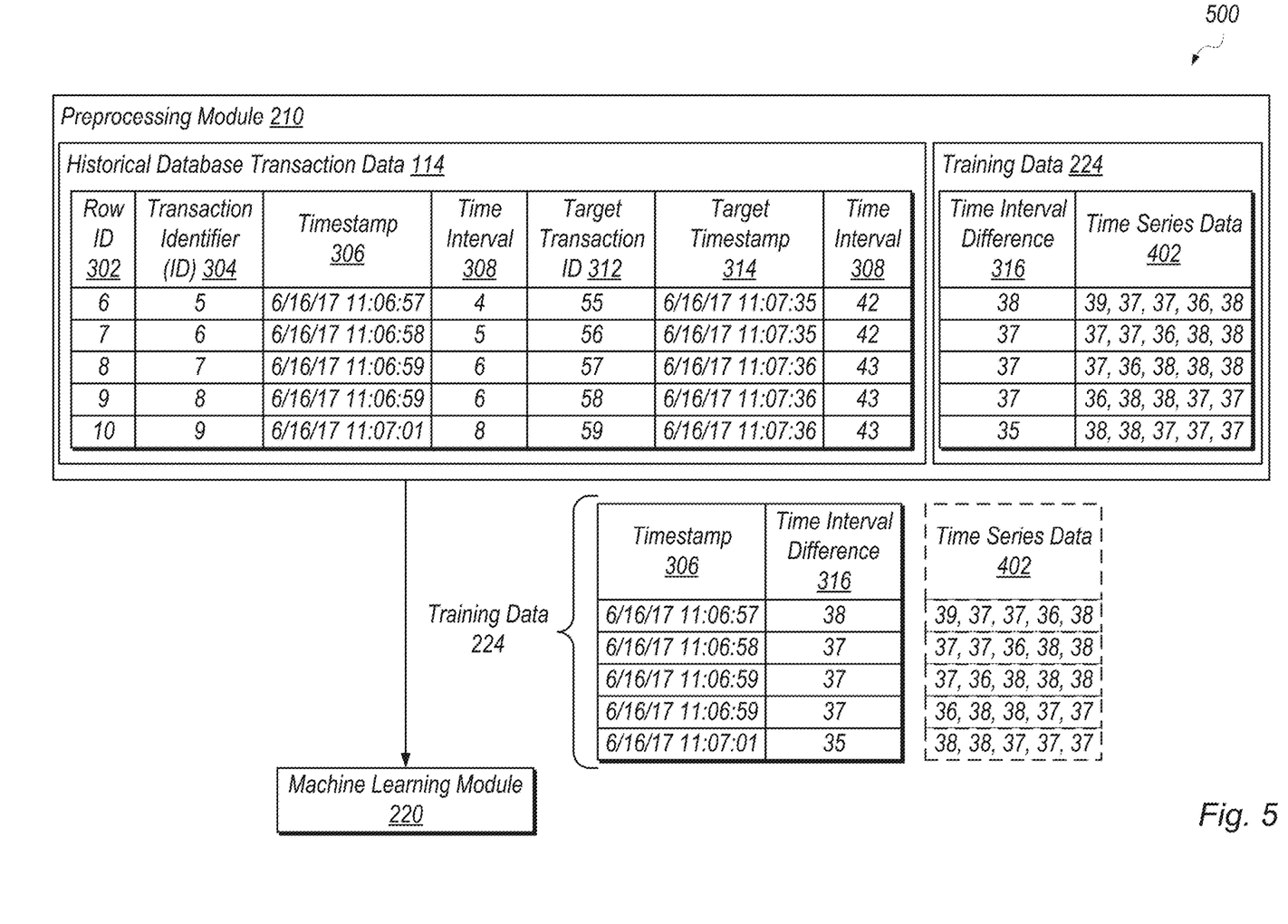
FIG. 5 is a block diagram illustrating example training data used to train a machine learning module, according to some embodiments.

Turning now to FIG. 5, a block diagram illustrating example training data used to train machine learning module 220. In the illustrated embodiment, system 500 includes preprocessing module 210 and machine learning module 220.

Preprocessing module 210, in the illustrated embodiment, inputs training data 224 to machine learning module 220 after generating time interval difference 316 and time-series data 402. In the illustrated embodiment, due to the size of the window selected when generating the time-series data, the resulting timestamp 306 and time interval difference 316 values selected for training data 224 include values for records 5-9.

In a first training scenario, preprocessing module 210 inputs timestamps 306 and time interval differences 316 for transactions 5-9 to machine learning module 220, while in a second training scenario the preprocessing module inputs time-series data 402 to the machine learning module. The training data 224 provided by preprocessing module 210 is customized based on the machine learning techniques used to train machine learning module 220. These two example training scenarios and their accompanying machine learning techniques are discussed below with reference to FIG. 6.

Example Machine Learning

Turning now to FIGS. 6A and 6B, block diagrams are shown illustrating two different machine learning modules 610 and 620 that are trained using different sets of training data. In the illustrated embodiment, system 600A includes a time-series module 610, while system 600B includes an autoregressive module 620.

In FIG. 6A, time-series module 610 receives time-series data 402 generated by preprocessing module 210 and generates predicted numerical output 602. Specifically, given a series as input (39.0, 37.0, 37.0 . . . ), time series module 610 will predict a next time value in seconds (e.g. 38.0). Predicted numerical output 602 may be a predicted time interval for retrieving records, for example. Time-series module 610 includes a recurrent neural network (RNN) 612 that is used during training to generate output 602. As one specific example, time-series module 610 may include machine learning sub-modules that are included in the Ludwig software toolbox. In this specific example, training of time-series module 610 to predict time specific data using Ludwig requires that a time "series" (e.g., time-series data 402) be supplied as input, while the output of the module is a numerical value specifying a predicted next value in time (e.g., predicted numerical output 602). In some embodiments, time-series module 610 is trained using timestamps 306 and time interval difference 316 in addition to time-series data 402. In some embodiments, system 600A includes steps for testing and verifying the training of time-series module 610. Example training and testing steps are discussed below with reference to FIG. 7.

In FIG. 6B, autoregressive module 620 receives timestamps 306 for records 5-9 and time interval differences 316 between corresponding pairs of records 5-9 and 55-59. Based on this training data, autoregressive module 620 generates predicted numerical output 604. The predicted numerical output 604 may be a predicted time interval difference between records 10 and 60. This predicted value may be used to retrieve 50 records from the database starting at timestamp 6/16/17 11:07:02, for example.

Once modules 610 and 620 have been trained using their respective example machine learning techniques, these modules may be used to predict a time interval based on an input starting time. In one specific example, if timestamp 6/16/17 11:06:57 is input to autoregressive module 620, it will output the time interval 38 seconds as the predicted time interval for retrieving 50 records from the database. Although FIG. 6 provides specific examples of machine learning techniques that may be used to train machine learning module 220 to predict a time interval for retrieving records, any of various machine learning techniques or time-series based machine learning algorithms may be used to train this module to predict a time interval based on a specified start time.

In some embodiments, the training data 224 generated by preprocessing module 210 is non-stationary data. Non-stationary time-series data includes data whose values are steadily increasing or decreasing over time (such as a trend), while stationary time-series data includes data whose values fluctuate above and below a particular baseline value over time (the mean and standard deviation of the data is similar over time). In such situations, computer system 110 may use different or additional machine learning techniques when training time-series module 610 and autoregressive module 620. For example, autoregressive module 620 may include an autoregressive integrated moving average (ARIMA) machine learning model that is used to predict future values for time-series data. Although the ARIMA machine learning model is provided as an example, any of various machine learning models may be used to process non-stationary time-series data to predict future values for time-series data.

Figure 7:
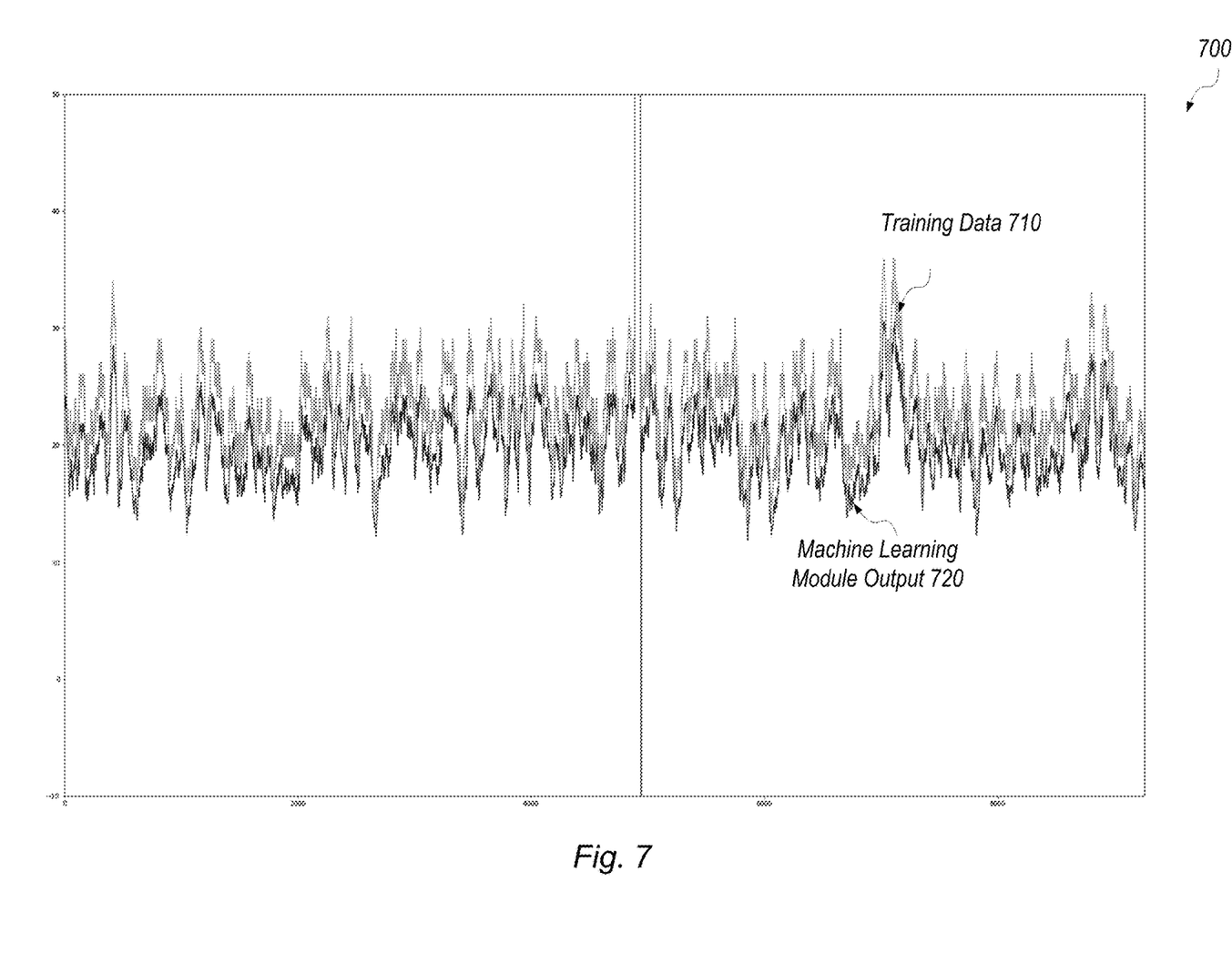
FIG. 7 is a diagram illustrating an example plot with testing output used to verify output of a trained machine learning module, according to some embodiments.

Turning now to FIG. 7, a diagram is shown illustrating example testing output generated using Ludwig and Matplotlib software. In the illustrated embodiment, plot 700 shows training data 710 as a signal that is generally above the signal showing machine learning module output 720. For example, the data shown in FIG. 7 is stationary data. This plot may be used to visually evaluate the training of machine learning module 220. For example, if training data 710 and machine learning module output 720 differ more than a threshold amount at any given point in time then training module 250 may provide feedback 208 to module 220 during additional training of the module. As one specific example, if machine learning module output 720 is 30 seconds at timestamp 6/16/17 11:07:02 and the training data 710 (i.e., time interval difference) at this same timestamp is 40 seconds, then this value may trigger a difference threshold and training module 250 provides feedback 208 to continue training machine learning module 220. Although FIG. 7 provides one non-limiting example method of testing and verifying training of machine learning module 220, other example methods and techniques may be used.

Example Method

Figure 8:
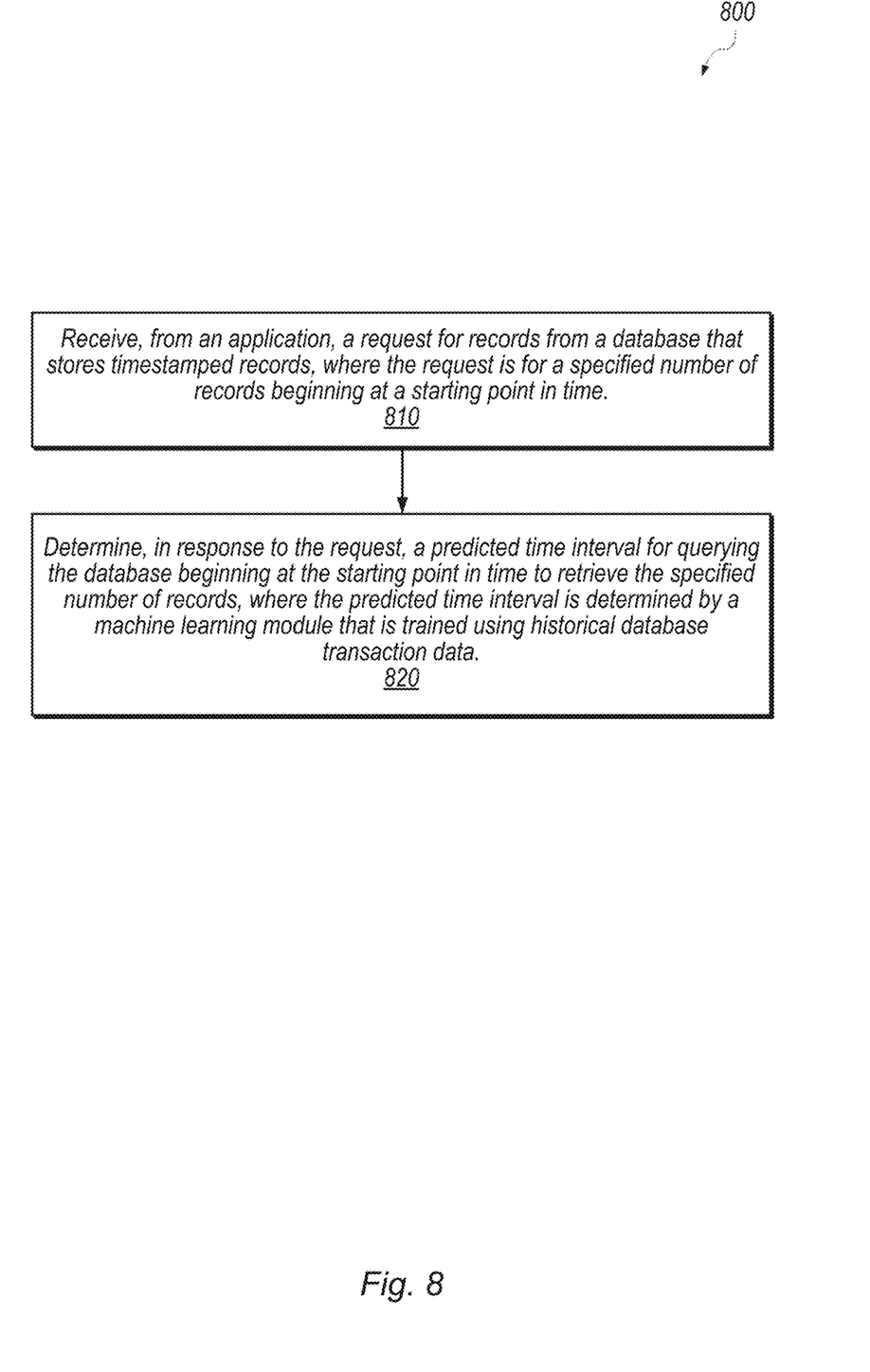
FIG. 8 is a flow diagram illustrating a method for predicting a time interval for retrieving a specified number of records beginning at a starting point in time, according to some embodiments.

FIG. 8 is a flow diagram illustrating a method for predicting a time interval for retrieving a specified number of records beginning at a starting point in time. The method 800 shown in FIG. 8 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired.

At 810, in the illustrated embodiment, a computer system receives, from an application, a request for records from a database that stores timestamped records, where the request is for a specified number of records beginning at a starting point in time.

In some embodiments, the computer system retrieves a plurality of timestamped records from the database based on the specified number of records and the starting point in time. In some embodiments, the computer system preprocesses the retrieved timestamped records using autoregressive techniques to generate stationary training data. For example, the computer system may use an ARIMA machine learning model to generate stationary training data.

At 820, the computer system determines, in response to the request, a predicted time interval for querying the database beginning at the starting point in time to retrieve the specified number of records, where the predicted time interval is determined by a machine learning module that is trained using historical database transaction data.

In some embodiments, the computer system retrieves, from the database, the specified number of records, wherein the retrieving is based on the predicted time interval. In some embodiments, the computer system transmits the retrieved records to the application. In some embodiments, the computer system transmits the predicted time interval to the application, where the transmitted predicted time interval is usable by the application to retrieve the specified number of records.

In some embodiments, the computer system trains the machine learning module using the historical transaction data by inputting the determined plurality of time intervals to the machine learning module. The plurality of time intervals may be specified in seconds, for example. In some embodiments, the machine learning module includes an autoregressive model that is trained using the plurality of time intervals, where the trained autoregressive model is usable to generate, based on a starting point in time, a numerical value that is the predicted time interval. The starting point in time may be a timestamp, for example. In some embodiments, the computer system trains the machine learning modules using the historical transaction data by generating, based on the plurality of time intervals, time-series data. In some embodiments, the time-series data includes one or more feature vectors. In some embodiments, the computer system inputs the time-series data to the machine learning module. In some embodiments, respective ones of the feature vectors include at least two successive ones of the plurality of time intervals.

In some embodiments, the machine learning module includes a recurrent neural network (RNN). In some embodiments, training the RNN is performed using time-series data. In some embodiments, the plurality of timestamped records specify times at which respective transactions occurred. In some embodiments, the timestamps for respective records include an indication of an hour, minute, and second at which the transactions occurred.

Example Computing Device

Figure 9:
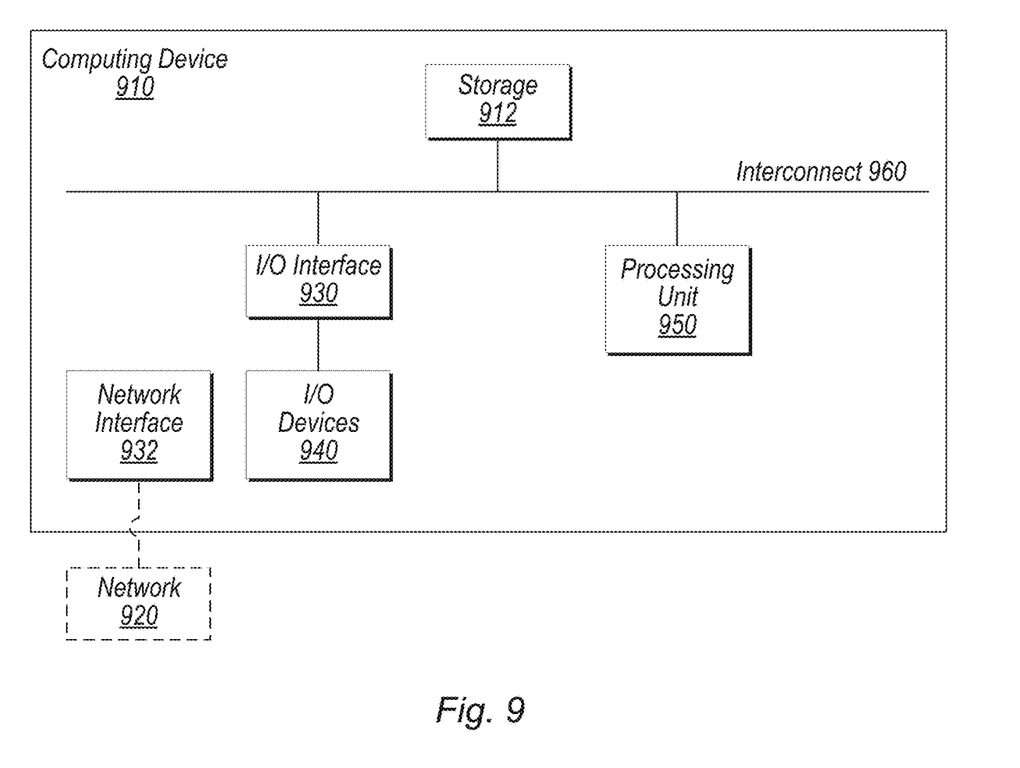
FIG. 9 is a block diagram illustrating an example computing device, according to some embodiments.

Turning now to FIG. 9, a block diagram of one embodiment of computing device (which may also be referred to as a computing system) 910 is depicted. Computing device 910 may be used to implement various portions of this disclosure. Computing device 910 may be any suitable type of device, including, but not limited to, a personal computer system, desktop computer, laptop or notebook computer, mainframe computer system, web server, workstation, or network computer. As shown, computing device 910 includes processing unit 950, storage 912, and input/output (I/O) interface 930 coupled via an interconnect 960 (e.g., a system bus). I/O interface 930 may be coupled to one or more I/O devices 940. Computing device 910 further includes network interface 932, which may be coupled to network 920 for communications with, for example, other computing devices.

In various embodiments, processing unit 950 includes one or more processors. In some embodiments, processing unit 950 includes one or more coprocessor units. In some embodiments, multiple instances of processing unit 950 may be coupled to interconnect 960. Processing unit 950 (or each processor within 950) may contain a cache or other form of on-board memory. In some embodiments, processing unit 950 may be implemented as a general-purpose processing unit, and in other embodiments it may be implemented as a special purpose processing unit (e.g., an ASIC). In general, computing device 910 is not limited to any particular type of processing unit or processor subsystem.

Storage subsystem 912 is usable by processing unit 950 (e.g., to store instructions executable by and data used by processing unit 950). Storage subsystem 912 may be implemented by any suitable type of physical memory media, including hard disk storage, floppy disk storage, removable disk storage, flash memory, random access memory (RAM-SRAM, EDO RAM, SDRAM, DDR SDRAM, RDRAM, etc.), ROM (PROM, EEPROM, etc.), and so on. Storage subsystem 912 may consist solely of volatile memory, in one embodiment. Storage subsystem 912 may store program instructions executable by computing device 910 using processing unit 950, including program instructions executable to cause computing device 910 to implement the various techniques disclosed herein.

I/O interface 930 may represent one or more interfaces and may be any of various types of interfaces configured to couple to and communicate with other devices, according to various embodiments. In one embodiment, I/O interface 930 is a bridge chip from a front-side to one or more back-side buses. I/O interface 930 may be coupled to one or more I/O devices 940 via one or more corresponding buses or other interfaces. Examples of I/O devices include storage devices (hard disk, optical drive, removable flash drive, storage array, SAN, or an associated controller), network interface devices, user interface devices or other devices (e.g., graphics, sound, etc.).

Various articles of manufacture that store instructions (and, optionally, data) executable by a computing system to implement techniques disclosed herein are also contemplated. The computing system may execute the instructions using one or more processing elements. The articles of manufacture include non-transitory computer-readable memory media. The contemplated non-transitory computer-readable memory media include portions of a memory subsystem of a computing device as well as storage media or memory media such as magnetic media (e.g., disk) or optical media (e.g., CD, DVD, and related technologies, etc.). The non-transitory computer-readable media may be either volatile or nonvolatile memory.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A non-transitory computer-readable medium having instructions stored thereon that are executable by a computing device to perform operations comprising:
   receiving, by a computer system from an application, a request for records from a database that stores timestamped records, wherein the request is for a specified number of records beginning at a starting point in time;
   inputting the starting point in time into a trained machine learning module, wherein the machine learning module is trained by:
      determining, based on traversing the database of timestamped records, a plurality of time intervals between timestamped records that occurred the specified number of records apart; and
      inputting the plurality of time intervals of timestamped records occurring the specified number of records apart into the machine learning module; and
   determining, in response to the request and based on output of the trained machine learning module, a predicted time interval for querying the database beginning at the starting point in time to retrieve the specified number of records; and
   retrieving, from the database, the specified number of records whose timestamps fall within the predicted time interval.

2. The non-transitory computer-readable medium of claim 1, wherein the operations further comprise:
   transmitting, to the application, the retrieved records.

3. The non-transitory computer-readable medium of claim 1, wherein the operations further comprise:
   transmitting, to the application, the predicted time interval, wherein the transmitted predicted time interval is usable by the application to retrieve the specified number of records.

4. The non-transitory computer-readable medium of claim 1, wherein the timestamped records stored in the database include historical database transaction data.

5. The non-transitory computer-readable medium of claim 4, wherein training the machine learning module using the historical transaction data further includes:
   inputting the determined plurality of time intervals to the machine learning module.

6. The non-transitory computer-readable medium of claim 4, wherein the machine learning module includes an autoregressive model that is trained using the plurality of time intervals, and wherein the trained autoregressive model is usable to generate, based on a starting point in time, a numerical value that is the predicted time interval.

7. The non-transitory computer-readable medium of claim 4, wherein training the machine learning module using the historical transaction data further includes:
   generating, based on the plurality of time intervals, time-series data, wherein the time-series data includes one or more feature vectors; and
   inputting the time-series data to the machine learning module.

8. The non-transitory computer-readable medium of claim 7, wherein respective ones of the feature vectors include at least two successive ones of the plurality of time intervals.

9. A non-transitory computer-readable medium having instructions stored thereon that are executable by a computer system to perform operations comprising:
   retrieving, from a database, a plurality of timestamped records, wherein the retrieving is performed based on a particular number of records and a starting point in time;
   generating, using the retrieved timestamped records, training data, wherein the training data includes a plurality of time intervals between timestamped records occurring the particular number of records apart;
   training a machine learning module to predict a time interval for querying the database beginning at the starting point in time to retrieve the particular number of records, wherein the training includes inputting the training data into the machine learning module;
   in response to receiving a request from an application for records from the database, determining, by inputting a starting point in time indicated in the request into the trained machine learning module, a predicted time interval for querying the database; and
   transmitting, to the application, the predicted time interval.

10. The non-transitory computer-readable medium of claim 9, wherein the generating further includes:
    preprocessing, using autoregressive techniques, the retrieved timestamped records to generate stationary training data.

11. The non-transitory computer-readable medium of claim 9, wherein training the machine learning module includes:
    traversing the database of timestamped records to determine a plurality of time intervals between timestamped records that occurred the particular number of records apart; and
    inputting the determined plurality of time intervals to the machine learning module.

12. The non-transitory computer-readable medium of claim 11, wherein the machine learning module includes an autoregressive model that is trained using the plurality of time intervals, and wherein the trained autoregressive model is usable to generate, based on a starting point in time, a numerical value that is the predicted time interval.

13. The non-transitory computer-readable medium of claim 11, wherein training the machine learning module further includes:
    generating, based on the plurality of time intervals, time-series data, wherein the time-series data includes one or more feature vectors; and
    inputting the time-series data to the machine learning module.

14. The non-transitory computer-readable medium of claim 13, wherein the machine learning module includes a recurrent neural network (RNN), and wherein training the RNN is performed using the time-series data.

15. The non-transitory computer-readable medium of claim 13, wherein respective ones of the feature vectors include at least two successive ones of the plurality of time intervals.

16. A method, comprising:
- receiving, by a computer system from an application, a request for records from a database that stores time-stamped records, wherein the request is for a specified number of records beginning at a starting point in time; and
- inputting the starting point in time into a trained machine learning module, wherein the machine learning module is trained by:
  - retrieving, from the database, historical database transaction data that includes a plurality of timestamped records, wherein the retrieving is performed based on the specified number of records and the starting point in time;
  - generating, using the historical database transaction data, training data; and
  - training, using the training data, the machine learning module to predict a time interval for querying the database beginning at the starting point in time to retrieve the specified number of records; and
- determining, in response to the request and based on output of the trained machine learning module, a predicted time interval for querying the database beginning at the starting point in time to retrieve the specified number of records; and
- retrieving, from the database, the specified number of records whose timestamps fall within the predicted time interval.

17. The method of claim 16, further comprising:
- transmitting, by the computer system to the application, the retrieved records.

18. The method of claim 16, further comprising:
- transmitting, by the computer system to the application, the predicted time interval, wherein the transmitted predicted time interval is usable to retrieve the specified number of records.

19. The method of claim 16, wherein training the machine learning module using the historical transaction data includes:
- traversing the database of timestamped records to determine a plurality of time intervals between timestamped records that occurred the specified number of records apart; and
- inputting the determined plurality of time intervals to the machine learning module.

20. The method of claim 16, wherein the plurality of timestamped records specify times at which respective transactions occurred, and wherein the timestamps for respective records include an indication of an hour, minute, and second at which the transactions occurred.

* * * * *